(12) United States Patent
Lind

(10) Patent No.: US 6,387,283 B1
(45) Date of Patent: May 14, 2002

(54) DESCENDING BED, CONTINUOUSLY REGENERATING TYPE FILTER WITH AN ADJUSTABLE LENGTH WASH CHAMBER

(75) Inventor: Henric Lind, Norrköping (SE)

(73) Assignee: Polyproject Sweden AB (SE)

( * ) Notice: Subject to any disclaimer, the term of this patent is extended or adjusted under 35 U.S.C. 154(b) by 0 days.

(21) Appl. No.: 09/554,045

(22) PCT Filed: Nov. 9, 1998

(86) PCT No.: PCT/SE98/02017

§ 371 Date: Jul. 6, 2000

§ 102(e) Date: Jul. 6, 2000

(87) PCT Pub. No.: WO99/24142

PCT Pub. Date: May 20, 1999

(30) Foreign Application Priority Data

Nov. 10, 1997 (SE) .............................................. 9704108

(51) Int. Cl.[7] .......................... B01D 24/30; B01D 37/00
(52) U.S. Cl. ...................... 210/786; 210/792; 210/793; 210/268; 210/274; 210/275
(58) Field of Search ................................. 210/268, 792, 210/795, 796, 793, 794, 797, 798, 786, 274, 275

(56) References Cited

U.S. PATENT DOCUMENTS

| 4,197,201 | A | | 4/1980 | Hjelmner et al. ........... 210/268 |
| 5,019,278 | A | | 5/1991 | Jacquet ....................... 210/268 |
| 5,454,959 | A | * | 10/1995 | Stevens ...................... 210/268 |
| 5,681,472 | A | * | 10/1997 | Jonsson et al. ............. 210/268 |
| 5,698,106 | A | * | 12/1997 | Larsson et al. ............. 210/268 |

FOREIGN PATENT DOCUMENTS

| SE | 76029990 | 9/1977 |
| SE | 76133677 | 8/1983 |
| SE | 88019591 | 7/1991 |

* cited by examiner

Primary Examiner—Robert J. Popovics
(74) Attorney, Agent, or Firm—Ostrolenk, Faber, Gerb & Soffen, LLP

(57) ABSTRACT

An apparatus for continuously filtering a suspension includes a filter-medium washer provided with length-adjustable walls.

18 Claims, 3 Drawing Sheets

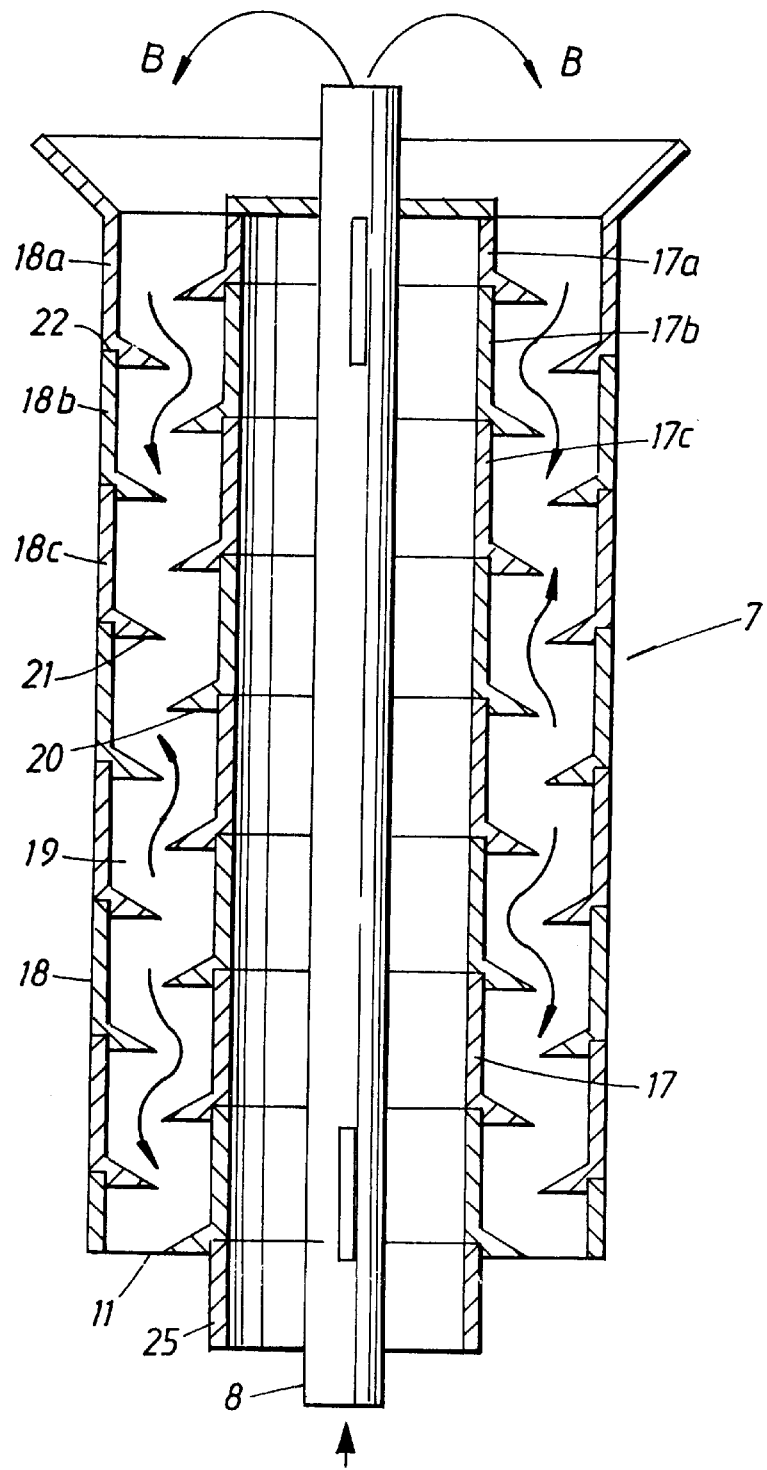

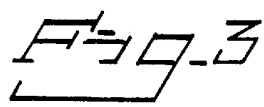 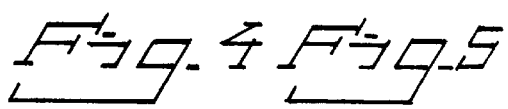
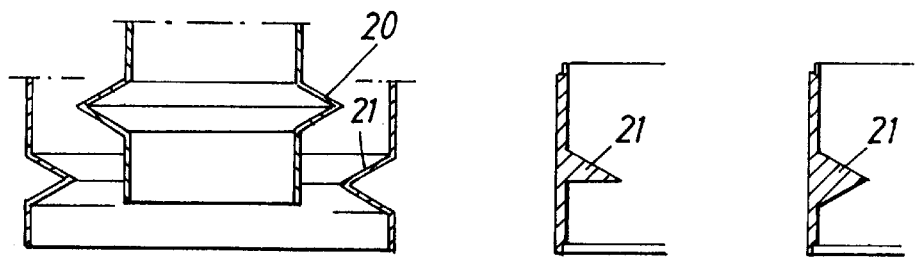
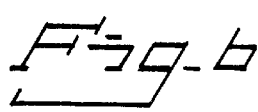
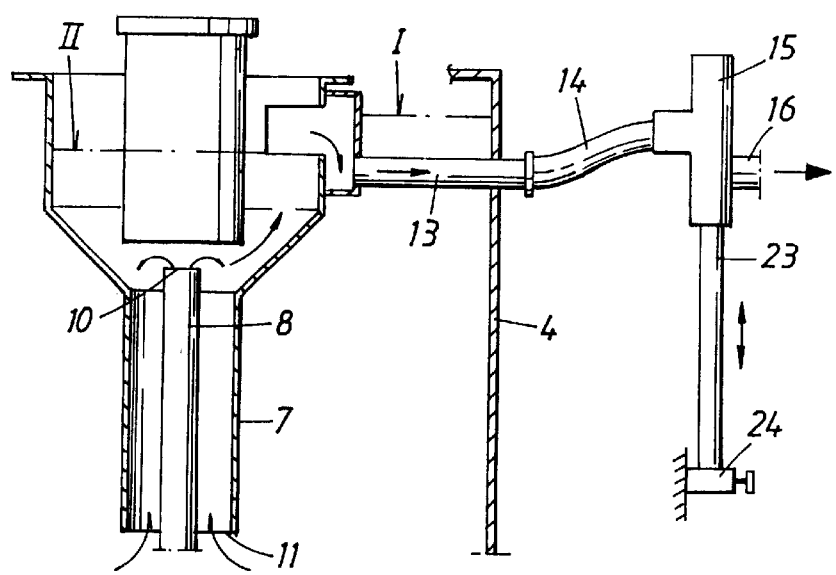
 
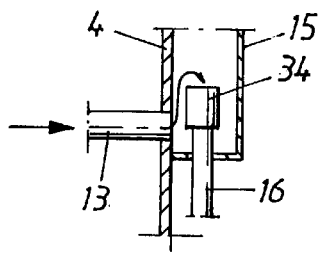 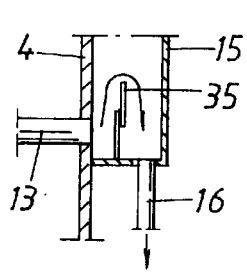

DESCENDING BED, CONTINUOUSLY REGENERATING TYPE FILTER WITH AN ADJUSTABLE LENGTH WASH CHAMBER

FIELD OF THE INVENTION

The present invention relates to a filtering apparatus and a method for filtration of a suspension.

BACKGROUND OF THE INVENTION

Filtering apparatus of this kind are used, among other things, in the purification of scrubber water, industrial sewage, drinking water and also in the purification of chemicals, wherewith liquid-carried contaminants and solids are filtered out as the liquid passed through a bed of filter particles, said filter particles normally being sand although not necessarily so. The filter medium may, for instance, be activated carbon. As the liquid passes through the sand in the filtering process, particles carried by the liquid will adhere to and contaminate or dirty the sand particles. It is therefore necessary to recondition the contaminated sand, such reconditioning conventionally being effected in a filter-medium washer located adjacent the actual filtering plant.

Filtering apparatus of this kind which include a filter-medium washer are known, for instance, from SE 7602999-0, SE 7613367-7 and SE 8801959-1.

With filtering apparatus of this kind, the liquid to be filtered is pressed up through a bed of sand held in a container and the filtrate leaves the container through an outlet located above the bed. The sand is dirtied by the liquid-carried contaminants most heavily at the bottom of the bed. Cleaning of the sand is carried out continuously, by passing sand from the lower part of the bed and up to the filter-medium washer, where the sand passes down through a wash chamber with the aid of gravity. At the same time, washing liquid is pressed up through the wash chamber and washes the sand. The sand falls from the wash chamber and passes to the upper part of the filter bed. Part of the filtrate is used as washing liquid and the resultant dirty washing liquid is then discharged as reject water.

In the case of SE 7602999-0, for instance, the filter-medium wash is located within the container that encloses the sand bed. Dirty sand is shifted to the upper part of the wash chamber with the aid of an airlift pump, while washed sand falls from the lower part of the wash chamber down onto the upper side of the bed.

In order for filtering apparatus of this kind to function optimally, the design of the filter-medium washer must be well tuned with respect to other apparatus components and to the prevailing operating situation. This can be difficult to achieve at times. On the one hand, the filter-medium washer will preferably have the smallest possible vertical extension, so as to avoid unnecessarily high plant. On the other hand, the washer shall be sufficiently large to ensure that the sand will be washed satisfactorily. The throughflow of washing liquid is also a critical parameter. An optimum in this respect constitutes a compromise between the requirement of a large flow so as to obtain the best possible washing effect, and the desire to restrict the flow so as not to unnecessarily waste washing liquid. Since the washing liquid is normally taken from the filtrate generated in the filtering process, it is desirable that the least possible amount is lost in the form of reject liquid.

Known apparatus of this kind are inflexible with respect to achieving effective washing of the soiled filter medium under the aforesaid conditions. In many cases, this results in plant that cannot operate optimally and which, in the worst case, can only be made to function satisfactorily with difficulty.

OBJECTS OF THE INVENTION

The object of the present invention is to solve this problem and to provide filtering apparatus and a filtering method which enable the filter-medium washer to be adapted optimally with respect to other plant components and also with respect to the operating situation in question.

SUMMARY OF THE INVENTION

According to a first aspect of the invention, this object is achieved with an apparatus of the kind defined in the preamble of Claim 1 and having the significant features set forth in the characterising clause of said Claim.

As a result of the regulating devices with which the apparatus is provided, the washing process can be optimised with respect to the vertical extension of the wash chamber such that said chamber will have an extension that ensures that the filter medium will be washed to the extent required without needing to over-dimension said chamber and make the apparatus large and bulky.

One simple and purposeful method of regulating the vertical extension of the wash chamber is to construct said chamber from a number of modules that can be connected sealingly to one another and disconnected from each other such as to enable said vertical extension to be varied either by adding or removing an appropriate number of modules, this being done, for instance, during the trimming phase of the apparatus. Consequently, an apparatus of this design constitutes a preferred embodiment of the invention.

In the case of a further preferred embodiment of the invention, the washing-liquid outlet means includes a vertically movable spillway. Adjustment of the position of the spillway influences the counterpressure against which the liquid acts as it flows through the wash chamber, and therewith also influences the rate of flow of said liquid.

The filter-medium washer will also preferably be arranged within the vessel included in the filtering apparatus, so as to obtain a compact plant, and so that the flows of filtering medium and liquid through the apparatus can be favourably formulated.

The filter-medium washer will conveniently include fully vertical walls, so that the force of gravity can be utilised in the best way in the process and stagnation of the filter medium in the wash chamber avoided.

A suitably designed wash chamber will include two cylindrical walls that form a ring-shaped wash chamber into which flanges extend from said walls. According to one preferred embodiment, each module is comprised of a wall-part that includes at least one flange.

In another preferred embodiment of the inventive apparatus, the washing liquid is comprised of filtrate arriving from the bed and collected in a container located above the bed. Filtrate is taken from the filtrate container through a clean liquid outlet. The pressure generated in the container is used to press filtrate through the wash chamber, where it is used as washing liquid. According to one preferred embodiment of the invention, the vertical position of the clean-liquid outlet can be adjusted, so as to adjust the pressure in said container and therewith the flow of washing liquid through the wash chamber.

The aforesaid embodiments of the inventive filtering apparatus and other preferred embodiments of said apparatus are set forth in the Claims appended to Claim 1.

According to a second aspect of the invention, the object of the invention has been achieved by means of a method of the kind defined in the preamble of Claim 14 and comprising the method steps set forth in the characterising clause of said Claim.

The inventive method affords advantages similar to those described above with reference to the inventive filtering apparatus. Advantageous embodiments of the inventive method are set forth in the Claims dependent on Claim 14.

BRIEF DESCRIPTION OF THE DRAWINGS

The invention will now be described in more detail with reference to preferred exemplifying embodiments thereof and also with reference to the accompanying drawings.

FIG. 2 is a schematic, longitudinal sectional view of part of the apparatus shown in FIG. 1.

FIG. 3 is a schematic, longitudinal sectional view of part of the apparatus shown in FIG. 1 in accordance with a preferred, alternative embodiment.

FIGS. 4 and 5 are sectional views of alternative embodiments of a part shown in FIG. 2.

FIG. 6 is a schematic, longitudinal sectional view of part of the apparatus shown in FIG. 1.

FIG. 7 illustrates a first alternative embodiment of a part shown in FIG. 6.

FIG. 8 illustrates a second alternative embodiment of a part shown in FIG. 6.

DESCRIPTION OF THE PREFERRED EMBODIMENT

Figure 1:
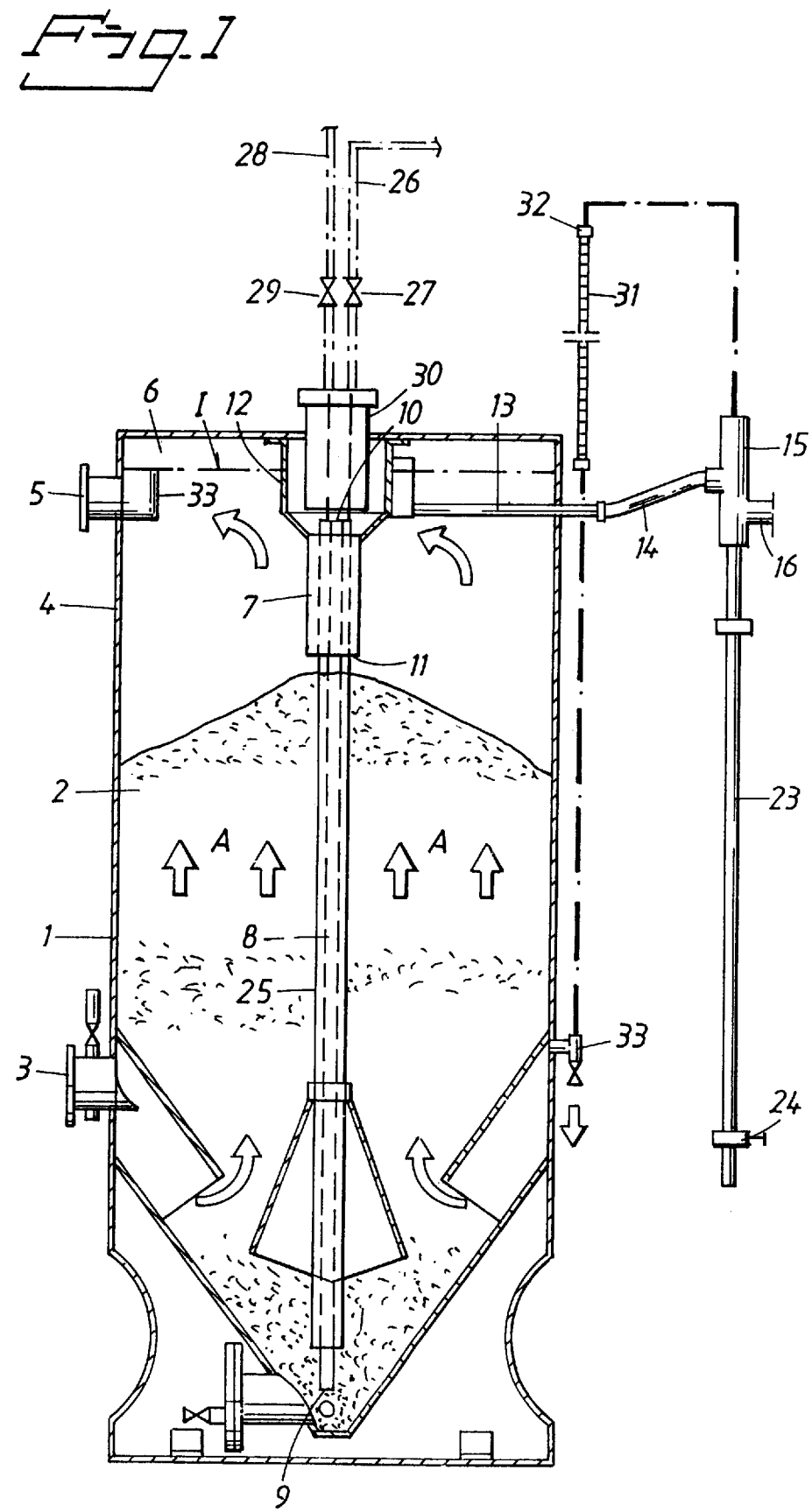
FIG. 1 is a schematic, longitudinal sectional view of a filtering apparatus according to one preferred embodiment of the invention.

FIG. 1 is a schematic, vertically sectioned view of an inventive filtering apparatus, and shows how the apparatus is constructed and its modus operandi.

The filtering apparatus comprises a cylindrical vessel 1 having a vertically orientated axis. The vessel 1 contains a bed 2 of a particulate or granular filtering medium, preferably sand. Located adjacent the bottom part of the sand bed is an inlet 3 for liquid to be filtered, this liquid normally being dirty water. The water flows up through the filter bed in the direction of the arrows A and is filtered as it passes through the bed. Filtered liquid, or filtrate, is collected in a container 4 which forms the part of the vessel 1 that is located above the bed. The filtered liquid exits from the container 4 through an outlet conduit 5 connected with the container 4 via a clean-water outlet 6 in the form of a spillway. The vertical position of the outlet 6 is determined by the upper edge of a wall 33. Although the wall is shown to be fixed in FIG. 1, it may alternatively be movable vertically so as to enable the level of the outlet 6 to be varied and therewith also the level of filtered liquid in the liquid container 4.

The container 4 accommodates within the vessel 1 a filter-medium washer 7 above the sand bed 2. Sand that has been dirtied during the filtering process is washed in the washer 7. Part of the filtrate is used to wash the sand.

The filter-medium washer is constructed so that dirty sand will move down therethrough and meet upwardly flowing liquid filtrate. Sand is delivered with the aid of an airlift pump 8 that extends in a protective tube 25 along the centre axis of the vessel. Other suitable types of pumps may, of course, be used instead. Provided at the bottom of the airlift pump is a suction opening 9 through which sand is sucked from the bottom part of the bed 2, where the sand is dirtiest. The sand is transported up through the airlift pump 8, which extends centrally through the filter-medium washer 7 and has an outlet opening 19 which discharges above the washer 7, said sand falling gravitationally down into said outlet. The filter-medium washer also includes a sand outlet 11 through which washed sand falls down onto the bed 2, for reuse. Sand is circulated continuously in parallel with the filtering process. The sand in the sand bed will thus constantly move slowly downwards in the bed as dirty sand is removed from the bottom of the bed, therewith replenishing the bed with washed sand at the top of the bed. The airlift pump 8 is operated with compressed air delivered through a compressed air conduit 26 that includes a regulating valve 27. The compressed air conduit extends down through the protective tube 25 to the inlet 9 of the airlift pump 8 located at the bottom of the bed. Clean water is delivered to the pump inlet 9 through a clean water conduit 28 which includes a regulating valve 29. A splash guard 30 is provided above the filter-medium washer. A measuring and air-purging pipe 31 that includes a sensor 32 is arranged externally of the container and connected to a decanting valve 33.

The washer 7 opens downwardly through the sand outlet 11. Consequently, filtrate present in the container 4 will be pressed in through the sand outlet 11 by the pressure exerted by the liquid column, up to the level of the spillway 6. The sand outlet 11 thus also constitutes an inlet for filtrate used to wash the sand. The liquid filtrate used to wash the sand flows out at the upper end of the washer, said upper end being isolated from the container 4 by walls 12, and is discharged through a reject water conduit 13. The reject water conduit is located beneath the level of the spillway 6, such that the hydraulic pressure will be sufficient to press the reject water out through the conduit 13. The reject water is taken from the reject water conduit to a reject water outlet 16, through the medium of a hose 14 and an adjustable spillway 15. Thus, the major part of the water entering through the inlet 3 and filtered in the bed will leave the apparatus through the outlet 5 as clean water, whereas a minor part of the water used to wash dirty sand will leave the apparatus through the reject water outlet 16 as dirty reject water.

FIG. 2 is an enlarged schematic, longitudinal sectioned view of the filter-medium washer 7 shown in FIG 1.

The filter-medium washer comprises an inner, tubular wall 17 and an outer tubular wall 18 which is coaxial with the inner wall, said walls defining therebetween an annular wash chamber 19. The inner tubular wall 17 has disposed therearound a number of flanges 20 which project into the wash chamber 19, while flanges 21 project into said wash chamber from the outer wall 18 in a corresponding manner. Seen axially, the flanges 21 an the outer wall are located approximately between two adjacent flanges 20 on the inner wall. The flanges (20, 21) on respective inner and outer walls extend roughly halfway into the wash chamber. The flanges therewith form an axially extending labyrinth passageway through which the media flow in zigzag paths, as indicated by the arrows drawn in the wash chamber. As before mentioned, filtered liquid is pressed in through the opening 11 down to the filter-medium washer 7 and pressed up through said chamber. The sand to be washed is sucked through the pipe 8 of the airlift pump together with non-filtered water up to the pump outlet 10, from which the sand runs down into the wash chamber, as indicated by arrows B, through said chamber, and then falls out through the opening 11 and down onto the sand bed. As the sand moves down through the wash chamber 19 through the zigzag path defined by flanges 20, 21, it meets filtered water passing upwardly in a corresponding path, wherewith the sand is washed successively by the water.

The cleanliness of the sand thus improves as the sand moves down through the wash chamber 19, and the sand that leaves said chamber through the opening 11 is, in principle, clean and can be returned to the bed for reuse. The water flowing up through the wash chamber 19 becomes gradually more dirty in a corresponding way, and leaves the apparatus through the reject-water outlet as described above with reference to FIG. 1.

As will be seen from the Figure, both the outer and the inner tubular walls are comprised of a number of respective modules 18a, 18b, 18c, etc., and 71a, 17b, 17c, etc. Each module can be detachably fastened readily to an adjacent module. This can be achieved, for instance, by providing one end of a module with a circular groove 22 for press-fit co-action with the other end of an adjacent module. Other means and methods of mutually connecting the modules in a manner which enables them to be readily disconnected are, of course, conceivable. Each inner-wall module and each outer-wall module of the illustrated embodiment includes only one flange.

It is also conceivable for each module to include several flanges, while not all modules need have mutually the same axial length and the same number of flanges. For instance, the filter-medium washer may comprise a relatively long basic module which includes a plurality of flanges and which is connected to a number of shorter, single-flange modules.

By varying the number of modules, the length of the washer can thus be adjusted to suit the different degrees of washing requirements on the one hand, and to tune to prevailing pressure conditions on the other hand.

FIG. 3 illustrates an example of flange construction. The modules may comprise ring-shaped elements made of plastic or sheet-metal in which each outwardly directed flange 20 has the form of a triangular extension in the ring and each inwardly directed flange 21 has the form of a triangular web-part in the ring.

FIGS. 4 and 5 illustrate respectively an alternative design of the flanges 21, in which said flanges are solid. As evident from the Figures, the flanges may slope on both sides thereof or solely on one side. The flanges may, of course, have shapes different to those shown, and may also be made of other types of material than those mentioned, without departing from the concept of the invention.

FIG. 6 is an enlarged, schematic view that illustrates the arrangement of the reject-water outlet. The adjustable spillway 15, to which the reject-water conduit 13 is connected via the hose 4, can be moved vertically by means of the rod 23 and locked firmly in a chosen position by means of a locking knob 24 attached to the rod 23. The vertical position of the spillway 15 determines the level II of the reject water pressed up from the washer 7. The reference I indicates the level of the filtered water in the container 4. The pressure difference represented by the level difference between the liquid surfaces I and II determines the force at which the water is pressed up through the washer 7, and therewith also the rate of flow of said water. Variation of the vertical position of the spillway 15 will result in corresponding variation of the distance between I and II, therewith enabling the flow of water through the washer to be regulated. An optimal balance can therewith be set between the waste of as little water as possible in the form of reject water on the one hand, and requisite washing of the and on the other hand.

FIG. 7 illustrates an alternative embodiment of the spillway 15, in which a pipe 16 that forms the outlet extends into the spillway housing. The pipe can be moved vertically, so as to enable the outlet level to be varied. Alternatively, the pipe may be fixed and its one end provided with art axially movable sleeve 34 which determines the outlet level.

FIG. 8 illustrates an alternative embodiment of the spillway 15, which includes a partition wall 35 which is axially movable to enable the outlet level to be adjusted.

In the case of the embodiments illustrated in FIGS. 7 and 8, the conduit 13 (see FIG. 6) need not be connected to the spillway 15 via a hose 14, which can be replaced with a rigid pipe.

What is claimed is:

1. A liquid filtering apparatus comprising:
   a vessel which contains a bed of particulate or granular filter medium, said bed having an upper side, an upper part, a lower part below said upper part,
   a filter-medium washer located above said upper side of said bed,
   a circulator for continuously transferring dirty filter medium from said lower part of said bed to said filter-medium washer, and for transferring washed filter medium from said filter-medium washer to said upper part of said bed, said washer including a wash chamber defined between walls that have at least a vertical extension, said circulator causing said dirty filter medium to be moved downwardly through said wash chamber and causing a filtered washing liquid to be moved up from said upper side of said bed through said wash chamber, and
   an adjuster for adjusting the length of said walls of said wash chamber in the direction of filter-medium flow from said upper part to said lower part of the bed.

2. A liquid filtering apparatus according to claim 1, wherein said adjuster is comprised of a plurality of modules, said modules being readily connected together and detached from one another, so as to enable the extension of the wash chamber to be varied by varying the number of modules.

3. A liquid filtering apparatus according to claim 1, wherein said filter-medium washer is located within said vessel.

4. A liquid filtering apparatus according to claim 1, wherein said wash chamber has a top and a bottom, said walls extending essentially fully vertically between said top and bottom.

5. A liquid filtering apparatus according to claim 1, wherein each said wall includes flanges that project into said wash chamber and that are vertically offset in relation to one another.

6. A liquid filtering apparatus according to claim 1, wherein said walls include an inner cylindrical wall having outwardly extending flanges and an outer cylindrical wall having inwardly extending flanges, said annular wash chamber having a circular cross-section.

7. A liquid filtering apparatus according to claim 1, wherein each said module includes a section of each said wall having at least one flange.

8. A liquid filtering apparatus according to claim 1, further comprising a flow regulator adapted to regulate the flow of washing liquid through said wash chamber.

9. A liquid filtering apparatus according to claim 8, wherein said flow regulator includes outlet conduit for washing liquid that has passed through said wash chamber, said outlet conduit including a vertically movable spillway.

10. A liquid filtering apparatus according to claim 1, wherein the washing liquid is comprised of filtrate obtained from said bed and said apparatus further includes a filtrate container which constitutes an upward extension of said vessel above said upper side of the bed and is provided with a clean liquid outlet intended for filtrate from said container and mounted to said vessel at a level above said top of said wash chamber, said filter medium washer having at the bottom thereof a washing liquid inlet which communicates with said container such that the filtrate will be flowing up through said wash chamber by static pressure.

11. A liquid filtering apparatus according to claim 10, wherein said spillway is located beneath said clean liquid outlet.

12. A liquid filtering apparatus according to claim 10, wherein said clean liquid outlet is provided with an adjusting element for adjusting its vertical position.

13. A liquid filtering apparatus according to claim 1, wherein said circulatory includes an airlift pump that has a filter-medium inlet at the bottom part of said bed, and a filter-medium outlet at a position above said wash chamber.

14. A liquid filtering method comprising the steps of:
passing liquid to be filtered through a bed of particulate or granular filtering medium having lower and upper parts, thereby accumulating filtered liquid above said upper part of said bed provided in a vessel,
transferring dirty filter medium from said lower part of said bed to a filter-medium washer, said filter-medium washer being provided with two radially spaced apart walls having a vertical extension and defining a wash chamber therebetween,
passing said dirty filter medium through said wash chamber in one direction toward said upper zone,
passing said filtered liquid through said wash chamber in a direction opposite to said one direction, thereby obtaining washed filter medium,
transferring said washed filter medium from said filter-medium washer to said upper part of the bed; and
adjusting said vertical extension of said walls of said wash chamber in response to prevailing operating conditions.

15. A method according to claim 14, wherein the step of adjusting said vertical extension extension includes varying the number of a plurality mutually connectable and disconnectable modules, which constitute each of said walls.

16. A method according to claim 14, further comprising the steps of leading said filtered liquid away from said wash chamber via a spillway, and adjusting a vertical position of said spillway with respect to said wash chamber, thereby modifying said flow of filtered washing liquid through said wash chamber.

17. A method according to claim 14, further comprising the step of providing a liquid container in said vessel above the upper zone for accumulating the filtrated liquid, providing a static liquid pressure in said vessel, thereby passing part of said filtered liquid through said wash chamber, providing a clean liquid outlet in said vessel communicating with said liquid container, and varying a vertical position of said clean liquid outlet with respect to said wash chamber, thereby adjusting the flow of said part of the filtered liquid through said wash chamber.

18. A liquid filtering method comprising the steps of:
(a) providing filter medium selected from the group consisting of granular and particulate medium to form a filter bed in an elongated vessel which extends along a longitudinal axis, said filter bed having upper and lower axial zones,
(b) passing washing liquid to be filtered through said filter bed, thereby obtaining a filtered washing liquid above said upper axial zone of said filter bed;
(c) continuously displacing dirty filter medium from said lower zone through a washing chamber in one direction, said washing chamber being defined between two radially spaced apart walls;
(d) simultaneously with step (c) continuously displacing said filtered washing liquid through said washing chamber along said filter-medium path in a direction opposite to said one direction, thereby obtaining washed filtering medium delivered to said upper zone of said filter bed; and
(e) adjusting a length of said walls in response to prevailing operating conditions.

* * * * *